(12) United States Patent
Tamersoy et al.

(10) Patent No.: US 9,898,858 B2
(45) Date of Patent: Feb. 20, 2018

(54) HUMAN BODY REPRESENTATION WITH NON-RIGID PARTS IN AN IMAGING SYSTEM

(71) Applicant: Siemens Healthcare GmbH, Erlangen (DE)

(72) Inventors: Birgi Tamersoy, Erlangen (DE); Kai Ma, Plainsboro, NJ (US); Vivek Kumar Singh, Monmouth Junction, NJ (US); Yao-jen Chang, Princeton, NJ (US); Ziyan Wu, Plainsboro, NJ (US); Terrence Chen, Princeton, NJ (US); Andreas Wimmer, Forchheim (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/157,563

(22) Filed: May 18, 2016

(65) Prior Publication Data

US 2017/0337732 A1 Nov. 23, 2017

(51) Int. Cl.

| | |
|---|---|
| *G06T 15/00* | (2011.01) |
| *G06T 17/00* | (2006.01) |
| *G06F 3/00* | (2006.01) |
| *G06T 17/20* | (2006.01) |
| *G06K 9/62* | (2006.01) |
| *G06K 9/00* | (2006.01) |

(52) U.S. Cl.
CPC ............ *G06T 17/005* (2013.01); *G06F 3/005* (2013.01); *G06K 9/00362* (2013.01); *G06K 9/6256* (2013.01); *G06T 17/205* (2013.01)

(58) Field of Classification Search
CPC ........... G06T 17/20; G06T 2207/10012; G06T 2207/30196; G06T 7/50; G06T 2207/30004; G06T 19/00; G06T 2200/08
USPC ......................................................... 345/420
See application file for complete search history.

(56) References Cited

U.S. PATENT DOCUMENTS

| | | | | |
|---|---|---|---|---|
| 8,400,455 | B2 * | 3/2013 | Gregory | .................. G06T 13/40 345/472 |
| 8,953,844 | B2 * | 2/2015 | Williams | ................ G06F 3/011 348/46 |
| 9,460,556 | B2 * | 10/2016 | Alon | ....................... G06T 17/10 |
| 9,465,980 | B2 * | 10/2016 | Craig | ................. G06K 9/00369 |
| 9,646,340 | B2 * | 5/2017 | Kapur | .................. G06Q 30/0643 |
| 9,656,162 | B2 * | 5/2017 | Polzin | .................. A63F 13/213 |
| 2015/0213646 | A1 | 7/2015 | Kai et al. | |

OTHER PUBLICATIONS

Anguelov, Dragomir, et al. "SCAPE: shape completion and animation of people." ACM Transactions on Graphics (TOG). vol. 24. No. 3. ACM, 2005.

(Continued)

*Primary Examiner* — Phu K Nguyen

(57) ABSTRACT

For human body representation, bone length or other size characteristic that varies within the population is incorporated into the geometric model of the skeleton. The geometric model may be normalized for shape or tissue modeling, allowing modeling of the shape without dedicating aspects of the data-driven shape model to the length or other size characteristic. Given the same number or extent of components of the data-driven shape model, greater or finer details of the shape may be modeled since components are not committed to the size characteristic.

20 Claims, 3 Drawing Sheets

(56) References Cited

OTHER PUBLICATIONS

Chen, Yinpeng, Zicheng Liu, and Zhengyou Zhang. "Tensor-based human body modeling." Proceedings of the IEEE Conference on Computer Vision and Pattern Recognition. 2013.
Lee, Sung-Hee, Eftychios Sifakis, and Demetri Terzopoulos. "Comprehensive biomechanical modeling and simulation of the upper body." ACM Transactions on Graphics (TOG) 28.4 (2009): 99.
Scheepers, Ferdi, et al. "Anatomy-based modeling of the human musculature." Proceedings of the 24th annual conference on Computer graphics and interactive techniques. ACM Press/Addison-Wesley Publishing Co., 1997.
Wilhelms, Jane, and Allen Van Gelder. "Anatomically based modeling." Proceedings of the 24th annual conference on Computer graphics and interactive techniques. ACM Press/Addison-Wesley Publishing Co., 1997.

\* cited by examiner

HUMAN BODY REPRESENTATION WITH NON-RIGID PARTS IN AN IMAGING SYSTEM

BACKGROUND

The present embodiments relate to human body representation systems. An adult human body has 206 bones, more than 600 skeletal muscles, and a divergent fat tissue distribution throughout the population, making the human body a complex object to model effectively and efficiently. Nonetheless, such a representation is becoming increasingly more desirable due to emerging applications in medical scanning, computer vision, computer graphics, and human-computer interaction.

While analyzing the exterior form (i.e. body pose and shape) of the human body, it is beneficial to consider the underlying structures that are responsible for creating the exterior form. This anatomical perspective common in modeling the human body is an articulated skeleton supporting several layers of deformable tissue including muscles, fat tissue, and skin. Each of these components is modeled and incorporated in various ways to obtain a representation that accounts for the variations in body pose and shape.

Anatomy-inspired geometric body models are one approach. Every anatomical component (e.g., the skeleton, muscles, fat, and tissue) is represented using geometric models. The goal is to have a very realistic representation of the human body, so that realistic instances may be synthesized with various poses and shapes. These methods are usually employed for computer animation applications, where the efficiency may be sacrificed in order to achieve more visually pleasing instances. In one example, most of the bones and the muscles in the upper body are modeled, resulting in a representation with 68 bones (147 degrees-of-freedom) and 814 skeletal muscles where each muscle is modeled using a piecewise line segment model (i.e., an idealization of the musculature). A physics-based soft tissue model creates a high quality skin surface. Such a model is expected to synthesize very realistic instances, but the skeletal system has more than a hundred degrees-of-freedom and the muscle system has hundreds of additional parameters to control. Hence, using such a model in a fitting scenario is not very feasible.

Another approach used for fitting is a data-drive body model, such as shape completion and animation of people (SCARE). For most non-graphics applications, a more simply or sufficiently complex skeletal system (e.g., 15-20 rigid parts) may still be represented geometrically. Rather than using a geometric representation of the deformable tissue, a data-driven method models the layers of deformable tissue. This decouples the deformations due to pose (e.g., orientation of bones or skeleton) from the deformations due to shape (i.e. person-specific size and other characteristics) and represents each separately. The skeleton parts are rigid or fixed in characteristics other than orientation, allowing for solution for orientation. Differently, the shape deformations are modeled using a linear subspace, allowing for patient specific variation. Therefore, the shape spaces cover all person-specific body shape deformations, both due to the changes in the skeletal system and the deformable tissue. Even though this is an intuitive representation, the shape space is limited due to the amount of variation handled.

BRIEF SUMMARY

By way of introduction, the preferred embodiments described below include methods, systems, instructions, and computer readable media for human body representation. Bone length or other size characteristic that varies within the population is incorporated into the geometric model of the skeleton. The geometric model may be normalized for shape or tissue modeling, allowing modeling of the skeleton without dedicating aspects of the data-driven shape model to the length or other size characteristic. Given the same number or extent of components of the data-driven shape model, greater or finer details of the shape may be modeled since components are not committed to the size characteristic.

In a first aspect, a system is provided for human body representation. An imaging system is configured to image a person having an exterior pose and a shape. A modeler is configured to deform an articulated tree-structured skeleton model having non-rigid parts to the exterior pose, the deformation including adapting lengths of the non-rigid parts of the articulated tree-structured skeleton to the exterior pose of the person, and to deform a mesh template to the shape with the adapted lengths normalized. A memory is configured to store the human body representation of the person based on the deformed skeleton model and the deformed mesh template.

In a second aspect, a method is provided for human body representation. A sensor captures a dataset representing an instance of a body. A skeleton of the body is modeled as bones having variable lengths. A shape of the body is modeled with a linear subspace learnt from training data. The linear subspace is decoupled from the variable lengths. The skeleton and then the shape are fit to the dataset for the instance of the body.

In a third aspect, a computer readable storage medium has stored therein data representing instructions executable by a programmed processor for human body representation. The storage medium includes instructions for initializing the human body representation to pose and skeleton size for an instance of a camera captured person, deforming the human body representation to shape due to tissue for the instance, the deforming being normalized to the skeleton size and pose based on the initialization, and transmitting the human body representation as deformed.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
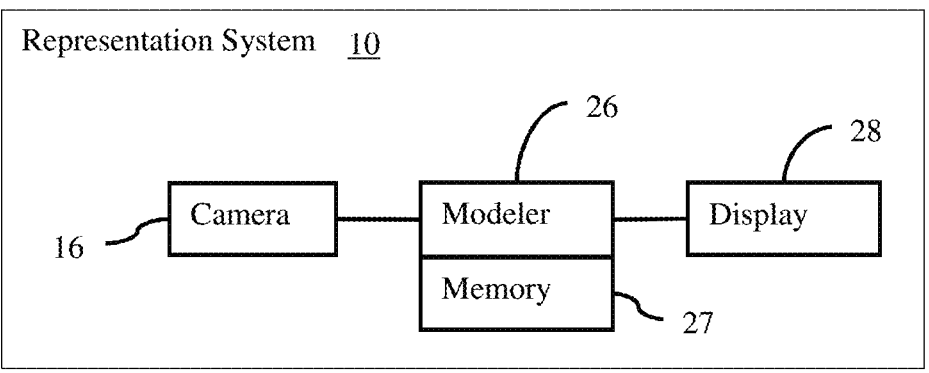
FIG. 1 is a block diagram of one embodiment of a system for human body representation.

A human body representation uses an articulated skeleton with non-rigid parts, including non-rigid with respect to size (e.g., length). The human body representation includes: 1) the articulated skeleton and 2) deformable tissue. This human body representation separates the body deformations due to the skeletal system from the body deformations due to the muscles, fat tissue, and/or skin. The articulated skeleton is a geometric representation inspired directly from the human skeletal system. In one example, the articulated skeleton is a configuration of non-rigid body parts where both the orientation and the length of each part may change depending on the configuration. If representing a single individual, then the body parts are modeled as rigid components sized to that single individual. Since the goal is to represent the generic bone and/or joint structure of the human body across groups of people or the population, an articulated skeleton with non-rigid body parts is more suitable.

Modeling the deformable tissue is a more complex task, so a data-driven method representing the layers of deformable tissue using a single linear subspace is used. In order to obtain a more homogenous representation, this linear subspace is learnt in a "skeleton-normalized" setting. Since the skeleton model is size variant, the linear subspace is learned for skeletons normalized to a given size. The "skeleton-normalized" deformable tissue model aims at representing a much smaller deformation space as compared to the shape space including the size, and hence may represent finer details with less model complexity. Each of the skeleton and tissue components is more effectively and efficiently represented within specialized subspaces. A computer may perform the fitting operation more quickly due to the shift of size to the geometric model.

In SCAPE, pose deformations are modeled using an articulated skeleton with size-rigid body parts, meaning parts do not alter their size (e.g., lengths) between instances (i.e., between different bodies). Therefore, the corresponding shape spaces have to cover all person-specific body shape deformations, both due to the changes in the skeletal system and the deformable tissue. By changing the size (e.g., length of body parts) in the skeleton model, a significant amount of the shape variation is directly explained by the skeleton itself with minimal added model complexity. Then, the data-driven shape space may be trained to represent finer details of deformable tissue variations given a same number of components in defining the shape space. The deformations due to the skeletal system are decoupled from the deformations due to the layers of deformable tissue. The outcome is a simpler model with higher representation power.

In a fitting scenario, the use of non-rigid size in the geometric skeleton model allows for a better model initialization. Better initialization may provide faster convergence and/or improved fitting accuracy in the data-driven shape fitting.

FIG. 1 shows one embodiment of a representation system 10 for human body representation. The representation system 10 models the human body, such as modeling a range of adult bodies. The modeling uses a geometric representation or pose model for the skeleton with non-rigid size. Variation in bone length and/or other size characteristic is incorporated into the geometric model. The modeling then uses a data-driven shape model for tissue layers. The data-driven shape model is decoupled or unencumbered by the size characteristic incorporated into the geometric pose model, such as by normalization to the size determined for the geometric skeletal model.

The system 10 includes a camera 16, a modeler 26, a memory 27, and a display 28. Additional, different, or fewer components may be provided. For example, a network or network connection (e.g., interface card) is provided, such as for networking with rendering servers or a data archival system. As another example, additional cameras or cameras of different types are provided. In another example, a user interface and corresponding input devices are provided. In yet another example, one or multiple light or flashlight sources are directed to a field of view of the camera 16. In another example, motion capture or other targets are provided for wearing by a person to which the human body representation is to be fit.

The modeler 26, memory 27, and display 28 are part of a motion capture system, computer vision system, robotic system, gaming system, computer graphics system, user interface, or medical imaging system. Alternatively, the modeler 26, memory 27, and display 28 are part of an archival and/or image processing system, such as associated with a database, workstation, or server. In other embodiments, the modeler 26, memory 27, and display 28 are a personal computer, such as desktop or laptop, a workstation, a server, a network, or combinations thereof. The modeler 26, memory 27, and display 28 may be parts of different systems, such as the memory 27 being in a database, the modeler 26 being part of a workstation, and/or the display 28 being an imaging system or remote display.

The camera 16 is part of an imaging system. The imaging system includes the camera 16 with or without other components, such as light sources. Any number of cameras 16 may be used. Each of the cameras 16 is of a same or different type.

The camera 16 is a time-of-flight camera 16. Laser or ultrasound is used to capture depth information of objects with the camera 16. The distance to different locations in the field of view of the camera 16 is determined. As a result, a surface of the body in three-dimensions is captured as a three-dimensional point cloud. Other three-dimensional cameras 16 may be used, such as stereo cameras and/or a camera in combination with capturing structured light projected onto the body.

Figure 4:
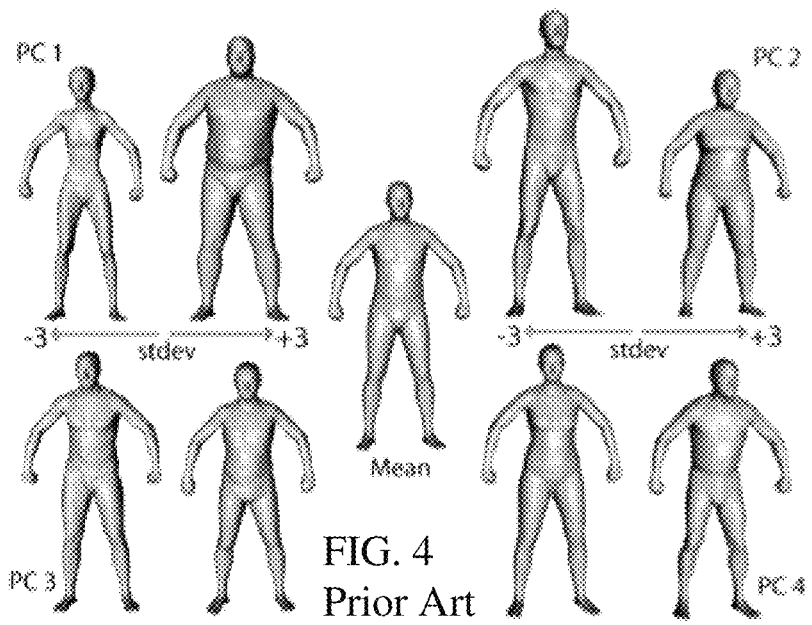
FIGS. 4 and 5 illustrate example prior art shape spaces.

The camera 16 is oriented to capture an adult human body. The camera 16 images a person having an exterior pose and shape. As represented in FIG. 4, different people may have different shapes. The field of view of the camera 16 is set or selected to capture the exterior of the body over any extent, such as all of the body or an upper body (e.g., waist up). Where multiple cameras 16 are used, different cameras 16 may capture different parts or views of the overall field of view of the cameras 16. Alternatively, the cameras 16 are oriented to have overlapping similar fields of view, each capturing most (e.g., 80%) of the same field of view.

The exterior pose and shape are imaged or captured as a three-dimensional point cloud (e.g., a two-dimensional depth map with a photo or a three-dimensional voxel data). For time-of-flight or other three-dimensional cameras 16, the depth of the body surface relative to the camera 16 is acquired as a depth map. Each photo or map is a two-dimensional array of information. The depth map represents different depths distributed over the two-dimensional field of view. Alternatively, the depth information is represented in a three-dimensional set of data, such as voxels. For example, the camera 16 is a medical scanner using ultrasound, radio waves, radiation emissions, x-rays, or other energy to acquire data representing a volume including the person.

The modeler 26 is a general processor, central processing unit, control processor, graphics processor, graphics processing unit, digital signal processor, three-dimensional rendering processor, image processor, application specific integrated circuit, field programmable gate array, digital circuit, analog circuit, combinations thereof, or other now known or later developed device for creating a human body representation, modeling a human body and/or fitting a human body representation to a person based on data captured by the camera 16. The modeler 26 is a single device or multiple devices operating in serial, parallel, or separately. The modeler 26 may be a main processor of a computer, such as a laptop or desktop computer, or may be a processor for handling some tasks in a larger system, such as in an imaging system. The modeler 26 is configured by hardware, firmware, and/or software.

The modeler 26 creates and/or uses a model of people or a human body representation. The discussion below is provided in the context of using the human body representation to fit to a 3D point cloud captured by the camera 16 for a specific person, but also includes a discussion of how the model is created. In other embodiments, the modeler 26 creates the human body representation without fitting or fits without creating.

In general, the modeler 26 creates the model and fits the model as is done in SCAPE or other hybrid geometry and data-driven body models. A hybrid skeleton or pose and shape representation is used. Unlike SCAPE, the geometric skeleton or pose component of the hybrid model includes non-rigid size characteristics, such as the length of the bones or skeleton parts. As a result, the size characteristic is shifted to the geometry model through normalization and components that would otherwise be committed to the size characteristic are available for more shape detail and/or to simplify fitting.

The modeler 26 is configured to deform to the exterior pose of the person an articulated tree-structured skeleton model having non-rigid parts. The exterior pose is represented by the 3D point cloud or other image capture of a specific person. The deformation is a fitting operation using the created geometric model. The geometric model is articulated in the sense that the different parts are jointed or may be oriented differently relative to each other. The articulation may or may not be limited, such as limiting the orientation based on physics of the human skeleton. The geometric model is a tree-structured model in the sense that specific parts connect to each other (e.g., hand to forearm, to upper arm, to shoulder). Other geometric models may be created.

For fitting, the modeler 26 adapts an orientation and size characteristic of the non-rigid parts of the skeleton model to the exterior pose. Any size characteristic may be used, such as the length of the parts. Each bone has a range of different lengths that may be used. The lengths may be limited, such as by any number of standards of deviation of occurrence in nature or throughout a given population (e.g., adults). The orientation and the size appropriate or best fitting to the exterior pose of the person is determined, defining the deformation of the skeleton model in orientation and size of parts.

In one embodiment of modeling of the skeletal deformations, the articulated tree-structured skeleton has M non-rigid parts to model the generic human skeletal system. M may be any number, such as 12-30 (e.g., 19). A particular configuration of this skeleton defines the length and the orientation of each body part: $=\{d_i, \omega_i, \alpha_i\}_{i=1}^{M}$, where $\theta$ is a vector defining the skeletal model of parts i, $d_i \in \mathbb{R}$ represents the length of part i, whereas the orientation of the part is defined relative to the parent part using a rotation axis $\omega_i \in \mathbb{R}^3$ and a rotation angle $\alpha_i \in \mathbb{R}$. Other vectors or non-vector definitions for the geometric model may be used.

Figures 2A, 2B, 2C:
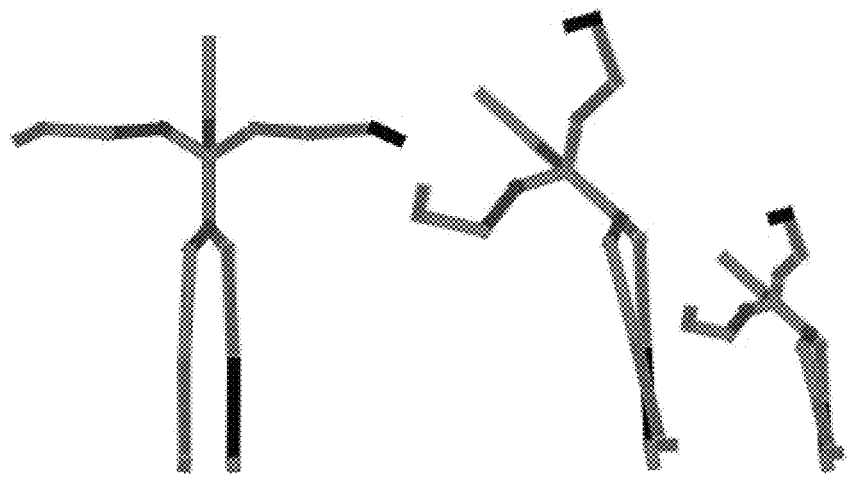
FIGS. 2A-C illustrate an articulated skeleton with 19 non-rigid body parts.

FIGS. 2A-C and 3A-C show an example skeletal model with 19 parts representing an entire human body (e.g., one part for the head, one part for the neck, two parts for two hands, two parts for each arm, two parts for the shoulders, two parts for two feet, two parts for each leg, and one part for the hip). FIGS. 2A-C show the geometric model or articulated tree-structured skeleton model in three different poses. FIGS. 2A and 2B show a similar sizing of the model with different orientations for some parts. FIGS. 2B and 2C show similar orientation for the parts, but with different sizing (e.g., different lengths for some of the parts).

The absolute orientation of a part, i, may be computed using the relative orientations of all the parts ancestors within the tree structure. Let $R_i, A_i \in \mathbb{R}^{3 \times 3}$ represent the relative and the absolute orientation of a part, respectively. The modeler 26 calculates $R_i$ from the angle-axis representation using the exponential map: $R_i = e^{\omega_i \alpha_i}$. The absolute part orientation is then computed by: $A_i = R_i R_{parent(i)} \cdots R_{root(i)}$, where $R_{root(i)}$ is the relative rotation of a given root part with respect to the world coordinates.

FIGS. 2A-C show two-dimensional views for simplicity, but the model covers three-dimensional space. If the model with non-rigid parts is fit to 2D data, the unknown depth information results in model ambiguity. For example, FIG. 2C may result from a model with very long legs at an acute angle or with very short legs at an obtuse angle. By fitting to a 3D point cloud of the camera 16, there may be no or less model ambiguity.

For deforming, the modeler 26 fits the model to the 3D point cloud. Any fitting may be used. For example, the 3D point cloud is skeletonized (e.g., centerlines identified) and the skeleton model is fit to the skeletonized lines based on a minimization of differences. As another example, a least squares or other fitting of the skeleton model to the 3D point cloud is used. In one embodiment, landmarks (e.g., joints) are detected from the 3D point cloud. The skeleton model is then fit to the landmarks.

Figures 3A, 3B, 3C:
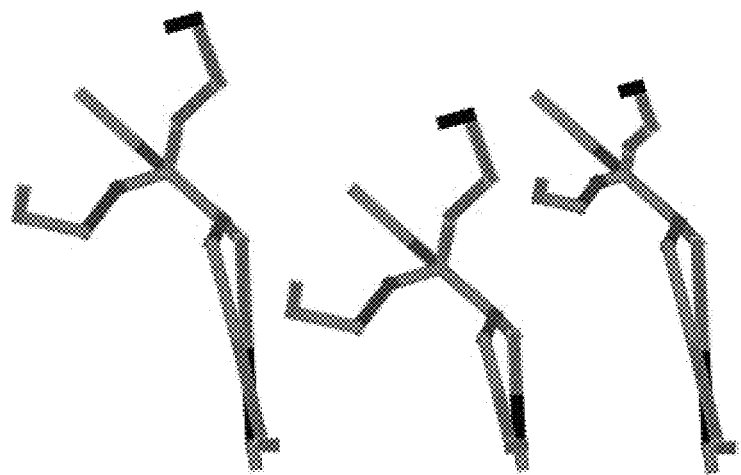
FIGS. 3A-C illustrate different body shapes at the skeletal level.

After deforming the skeleton model, the modeler 26 is configured to deform a mesh template without deforming for the size (e.g., length). One advantage of an articulated skeleton with size-based non-rigid parts is the overall human body model initialization. With size-rigid body parts, the skeletal model may only be capable of explaining the input for people with average body sizes and ratios. On the contrary, with size non-rigid parts, the model can explain a much wider range of body deformations right at the skeletal level and hence achieve a better initialization. FIGS. 3A-C show three different sizes all with a same or similar orientation of parts. The deformation with size non-rigid parts allows fitting and initialization to a range of different people.

The modeler 26 uses a data-driven body model for the tissue. The shape portion of the hybrid human body representation is based on probability, statistical, or other population or example-derived definition of possible shapes. For example, a linear subspace defining shapes of parts is learned. The shape deformations are modeled using a linear subspace. This subspace is learnt from training data using Principal Component Analysis (PCA) or other transform.

The body shape is discretized by a point cloud. The data-driven shape model is represented using a mesh. The shape is captured with a three-dimensional mesh, such as a triangular mesh (e.g., edge connected triangles). In one embodiment, arbitrary poses and shapes are modeled as follows based on SCAPE. Let $X=\{V_x, P\}$ be a template mesh defined as a set of vertices, $V_x=\{x_1, \ldots, x_M\}$, and a set of triangles, $P=\{p_1, \ldots, p_N\}$. The template mesh is a normalized or mean mesh. After transforming many examples to a mean size and/or orientation, the template mesh is defined.

For fitting, an arbitrary 3D body mesh $Y=\{V_y, P\}$ is captured as an instance for a particular person by the camera 16. The triangle-level transformations that would map X to Y are represented as:

$$\Delta y_{n,q} = R_{l[n]} S_n Q_n \Delta x_{n,q}$$

where $\Delta y_{n,q}$ and $\Delta x_{n,q}$ are vectors representing the $q^{th}$ edge of triangle n in the instance and template meshes, respectively. l[n] is the body part to which the triangle n belongs. $R_{l[n]}$, $S_n$, and $Q_n$ are linear transformations corresponding to: the rigid pose (rotation-only), shape, and non-rigid pose-induced shape, respectively.

In the SCAPE model, $S_n$ is assumed to be generated from a linear subspace that is independent of the pose. This subspace is learnt from a set of body meshes of different individuals performing a similar pose. FIG. 4 shows examples of people in a same or template pose used to learn the shape subspace in SCAPE.

Figure 5:
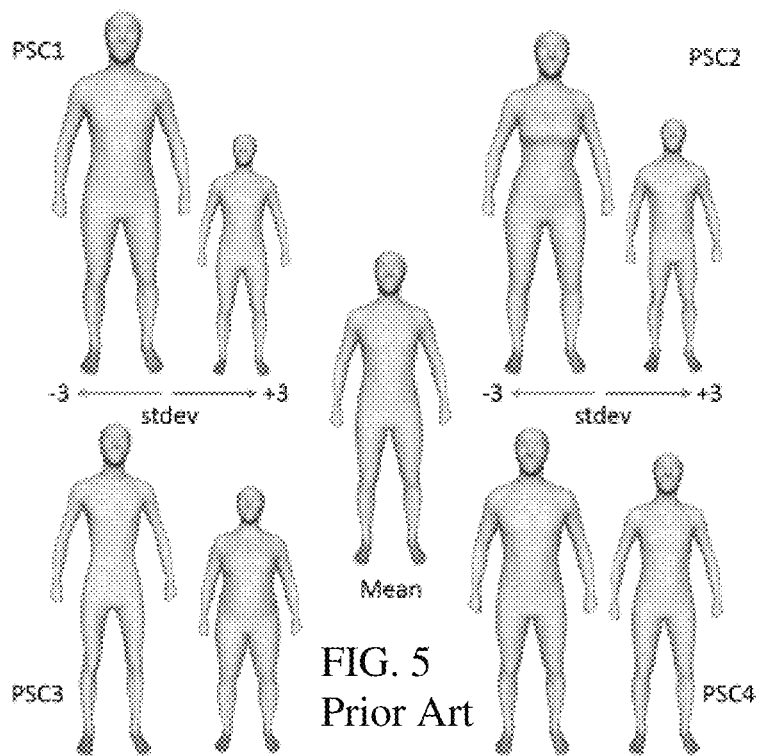

Inaccuracy may result due to the separation of shape and pose deformations (as done in SCAPE) since pose deformation is person dependent. To address this problem, triangle-level transformations between the template X and an instance Y may be redefined as:

$$\Delta y_{n,q} = R_{l[n]} D_n \Delta x_{n,q}$$

where the non-rigid deformation matrix $D_n$ is defined as a function of both local pose and shape parameters. Local shape parameters (part specific) are constrained by a global (whole-body) shape subspace. FIG. 5 shows an example shape space with this redefinition.

The modeler 26 uses either of the mesh fitting approaches above or a different approach, but accounts for the size non-rigidity of the geometric model. For fitting, the mesh template is deformed to the shape as represented by the 3D point cloud. The deformation is performed with the adapted lengths of the geometric model normalized to a mean size (e.g., mean length) for the fitting. The deformed mesh template is converted to the adapted lengths as normalized.

By normalizing the adapted lengths of the geometric model to mean lengths of the size non-rigid parts for shape fitting, the size (length in this example) is decoupled from the shape fitting. With an accurate representation of the skeletal system, the deformations due to the skeletal system are decoupled from the deformations due to the layers of deformable tissue (e.g. muscles, fat tissue, skin, or combinations thereof). The template mesh X and an instance mesh Y (i.e., 3D point cloud or depth map for a particular person) are used as is done in SCAPE, but with the normalization. Given the skeletal configuration of the instance mesh, $\theta_Y=\{d_i, A_i\}_{i=1}^M$, the instance mesh is "skeleton-normalized" as follows, defined at the triangle level:

$$\frac{1}{d_i} A_{l[n]}^{-1} \Delta y_{n,q} = \Delta y'_{n,q}$$

where $d_i$ is now used as the size (e.g., length) ratio rather than just the size and $A_i$ is used as the orientation relative to the template part rather than the absolute orientation. The size ratio and orientation relative to the template part are calculated from the absolute size and orientation.

For the shape subspace using normalization, a set of instance meshes of different individuals with different poses are collected. Alternatively, the set is of people in a similar pose.

A combined model for the layers of deformable tissue is learnt by first "skeleton-normalizing" each of these instances, and then performing principle component analysis (PCA) or other transform. PCA, defined at the triangle level, is represented as:

$$\Delta y'_{n,q} = S_n \Delta x_{n,q}$$

$$S_n = U_n \beta_n + \mu_n$$

where $U_n$ and $\mu_n$ are the bases and the mean of the subspace corresponding to the triangle n, respectively. Corresponding shape parameters (i.e., shapes regularized in the linear subspace) are represented with $\beta_n$. Other learning than PCA may be used, such as bootstrap shape space learning. In other embodiments, Q and S are modeled as local and global deformations and combined for learning the deformable tissue representation.

The modeler 26 is configured to deform the mesh template. For fitting, the deformation is a function of the ratios of the adapted sizes to the mean sizes of parts, absolute orientations of the non-rigid parts, and one or more linear transforms. For example, a pose-induced shape deformation is performed as a linear transformation. The mesh template is deformed to the shape of the person captured by the camera 16 as a function of bases and means of the PCA or other subspace using a linear subspace.

The linear subspace representing the various shapes for the different parts and/or mesh is independent of the pose and/or the size of the geometric model. Similar to SCAPE, the pose-induced shape deformations are modeled as a linear transformation, $Q_n$. This is useful for accurately representing the non-rigid deformations around the joints. With this addition, the triangle-level transformations to map X to Y are defined as:

$$\Delta y_{n,q} = d_{l[n]} Q_n A_{l[n]} S_n \Delta x_{n,q}.$$

The model fitting is formulated as an optimization problem:

$$\operatorname{argmin}_{d,\omega,\alpha,\beta,Y} \Sigma_n \Sigma_{q=2,3} \|d_{l[n]} Q_n A_{l[n]} S_n \Delta x_{n,q} - \Delta y_{n,q}\|^2 + \Sigma_{i=1}^L w_i \|y_i - z_i\|^2$$

where $\{z_i\}$ represents the data (e.g., 3D point cloud or depth map) to which the template mesh is fit. Other optimization may be used for fitting.

The template mesh may be annotated. For example, CT or other medical imaging is performed differently for patients with different poses and/or shapes. These differences are defined by the annotations or linked to the human body representation. By fitting to the patient, the medical imaging may be automated and/or account for the different imaging settings. The deformed template mesh defines the rules or settings based on the deformation. Other applications may benefit, such as motion capture, video generation, computer vision, computer graphics, or human-computer interaction.

In one embodiment, the modeler 26 is configured to generate an image from the human body representation. The image is rendered from the fit mesh, such as rendering using alpha blending, a graphics rendering pipeline, or other surface rendering. An image captured by the camera 16 may be output with or without the rendering from the fit model.

The memory 27 is a graphics processing memory, video random access memory, random access memory, system memory, cache memory, hard drive, optical media, magnetic media, flash drive, buffer, database, combinations thereof, or other now known or later developed memory device for storing data used in the hybrid model creation and/or use. The memory 27 is part of the camera 16, part of a computer associated with the modeler 26, part of a database, part of another system, or a standalone device.

The memory 27 stores captured images, depth maps, 3D point clouds, models, model parameters, the human body representation before and/or after fitting to a person, size ratios, orientations, training data, or other data. For training data, data at any stage of processing may be stored, such as 3D point clouds and/or fit skeleton models of many people. In one embodiment, the memory 27 stores the human body representation of the particular person based on deforming the skeleton model and the deformed mesh template.

The memory 27 or other memory is a computer readable storage medium storing data representing instructions executable by the programmed processor 26 for creating or using a human body representation. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The display 28 is configured to display the rendered image of the human body representation or other model information (e.g., fit model parameters). The display 28 is a monitor, LCD, projector, plasma display, CRT, printer, or other now known or later developed devise for outputting visual information. The display 28 is configured by receiving images, graphics, or other information from the modeler 26, memory 27, or camera 16.

Figure 6:
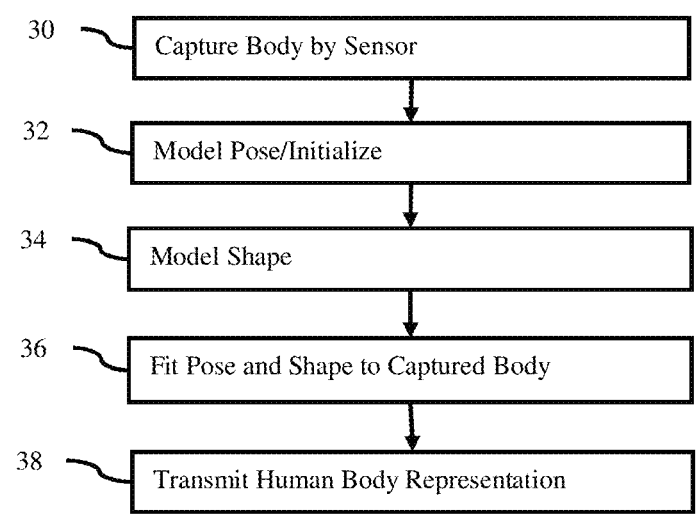
FIG. 6 is a flow chart diagram of one embodiment of a method for human body representation in a representation system.

FIG. 6 shows a flow chart of one embodiment of a method for human body representation. The method is implemented by the representation system 10 of FIG. 1 or another system. For example, act 30 is performed by a camera or a medical scanner, and acts 32-38 are performed by a modeler, a medical imaging system, a workstation, and/or server. Any one or more of the acts may be performed by different devices.

The acts are performed in the order shown (top to bottom) or other orders. For example, act 30 is performed after acts 32 and/or 34.

Additional, different, or fewer acts may be provided. For example, an act is provided for displaying a rendering or parameter values from the human body representation after fit to a particular person. As another example, acts 30, 36, and/or 38 are not provided, such as where the hybrid model using non-rigid size for the geometrical skeleton model and skeleton normalization for the data-driven shape model is provided without fitting to a particular person. As yet another example, user input is provided for controlling or other purposes.

In act 30, a sensor captures a dataset representing an instance of a body. A person is scanned or imaged. For training the shape subspace, the sensor may capture multiple datasets representing instances of bodies.

In one embodiment, one or more photographic or optical images of the person are acquired with a camera. The camera is directed to the person in a desired or unplanned pose, such as when and/or where a patient is being, has been, or is to be scanned by a medical imaging scanner. In another embodiment, a medical imaging scanner scans the person. Based on reconstruction and/or the scan format, a dataset representing the interior and exterior of the patient is acquired. Using segmenting or other image processing, an exterior surface of the patient is extracted.

For optical imaging, the person is unclothed so that the image is of the skin of the patient. Tight clothing may be used instead. Alternatively, the camera operates with millimeter waves or is a thermal camera to image the skin of the patient through clothing.

The sensor captures a three-dimensional representation of an exterior of the instance of the body. Voxels from a dataset (e.g., 3D dataset) representing a volume are acquired. The skin is then segmented. Alternatively or additionally, a surface defined in three dimensions is acquired. For example, the sensor acquires an optical image in 2D and depth information for each pixel, providing a depth map as the surface.

Image processing or filtering may be applied to the captured data. For example, the background is removed from photographic images. Any removal may be used. Image processing detects the boundary of the person, and data outside the boundary is removed. A photographic image of the space without the person may be subtracted from the image of the person to remove the background. Manual, automatic, or semi-automatic cropping may be used. Depth information may be used to identify background for removal. As another example, segmentation is applied to remove information from the interior of the patient.

The resulting data after background removal represents just the person. This resulting data represents or is used to reconstruct a three-dimensional representation of the skin or outer surface of the patient. The exterior surface of the patient is reconstructed. Any surface representation may be reconstructed, such as polygonal surface or other mesh. The mesh may or may not be populated with scalar values from and/or texture from the photographic image.

The representation of the exterior surface is 3D. Using depth mapping, image processing from photographs taken at different angles relative to the person, deformations in a projected grid, depth measurements (e.g., lidar) or other process, the 3D exterior surface of the patient is reconstructed. A 3D polygonal surface with or without texture is formed.

In act 32, the modeler models a pose of the body as bones having variable lengths and/or other size. The modeling is a generic or template representation not yet fit to a particular person. The geometric model or parameters thereof are created and/or loaded for fitting.

In addition to modeling the orientation of parts emulating the skeleton, size information is also geometrically modeled. For example, the pose or skeleton model includes variable lengths of each part. The geometric model addresses the orientations and the lengths of different parts.

The skeleton is modeled as one part of a hybrid for the human body representation. When the model is fit to an instance of a sensor-captured person, the skeleton part of the human body representation is first fit. This initializes the human body representation. The orientation of the parts of the skeleton and size (e.g., length) of at least one part of the skeleton are fittable to the instance. Once fit, this initial skeleton information is used in the data-driven fitting for shape.

In act 34, the modeler models the shape of the body with a linear subspace. The modeling is a generic or template representation not yet fit to a particular person. The data-driven shape model or parameters (e.g., subspace and mesh template) thereof are created and/or loaded for fitting.

The linear subspace is learnt from training data. Any number (e.g., tens, hundreds, or thousands) of examples are gathered. Instances from many people and/or many poses are gathered. The training data is initialized to the geometric model and then used to learn the linear subspace after normalizing the fit skeleton models. Using principle component analysis or other learning, a shape subspace is created. The shape subspace defines various shapes in a linear manner for each part and/or for global representation. By identifying a combination of shapes in the linear subspace, a shape of a person is defined. The learning defines the linear subspace.

Any representation of shape may be used. In one embodiment, the model uses mesh template. For learning and/or fitting, the mesh template is normalized to a mean size. The training data is normalized in size, allowing the learning of the linear subspace to be for the shape decoupled from the variable lengths or other size of the geometric model. Alternatively, fit geometric models are normalized for learning in the shape space. The mesh template provides a mean shape with the size normalized. The shape model includes the mean mesh template as well as the learnt linear subspace to define ranges of variation from the mean.

The model includes an optimization for fitting. Using a size ratio, orientation, shape linear subspace term, and pose-induced shape deformation as a linear transformation, the template mesh may be transformed to the captured instance for a person. The pose-induced shape deformation addresses orientation variation. The size ratio incorporates the normalization into the fitting of the shape model.

In act 36, the same or different modeler used to create the hybrid model forming the human body representation fits the hybrid model to a particular instance of a body. The pose and then the shape are fit to the dataset (e.g., surface mesh) for the instance of the body.

The fitting is initialized using the geometric model of the hybrid. The orientation and size of the various parts are fit to the instance. For example, landmarks are detected from the captured data for the person. The parts of the geometric model are then fit to the landmarks, such as fitting an arm part orientation and length based on detected wrist and elbow.

Once initialized, the shape is fit to the instance. The shape is fit as a function of a size ratio (e.g., length ratio). The initialized pose is normalized to a mean for fitting the shape. The shape is fit using the size ratio (e.g., fitted variable lengths to mean lengths), a pose-induced shape deformation due to orientation, an orientation for the pose, and the linear subspace. The human body representation is deformed to shape due to tissue for the instance. The combined model is solved or optimized to morph the template mesh to the mesh for the instance.

In act 38, the human body representation is transmitted. The human body representation is deformed to represent a particular person. The fitting defines a mesh representing the instance of the human body, but parameterized by the model. Rather than using the mesh from the sensor (e.g., camera), the model is fit to the instance. The model parameters, such as the deformed template mesh with or without the geometric model of the skeleton as fit for orientation and size, are transmitted. The human body representation as deformed to the instance is transmitted.

The transmission is to a memory, such as for storage. The transmission occurs in one batch or occurs over time as the fitting occurs. In other embodiments, the transmission is to a network for communication or to a renderer (graphics processing unit).

The transmission may be to a display, such as transmitting a rendering of the human body representation. An image is rendered from the 3D polygonal surface of the human body representation. The texture from the capture of the instance may or may not be included in the rendering. The rendering may or may not use shading. The lighting is virtual, such as from a user-defined source. In one embodiment, the actual lighting in the room during capture of the instance is detected and used for shading.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for human body representation, the system comprising:
   an imaging system configured to image a person having an exterior pose and a shape;
   a modeler configured to deform an articulated tree-structured skeleton model having non-rigid parts to the exterior pose, the deformation including adapting lengths of the non-rigid parts of the articulated tree-structured skeleton to the exterior pose of the person, and to deform a mesh template to the shape with the adapted lengths normalized; and
   a memory configured to store the human body representation of the person based on the deformed skeleton model and the deformed mesh template.

2. The system of claim 1 wherein the modeler is configured, after deforming the skeleton model, to deform the mesh template without deforming for the length.

3. The system of claim 1 wherein the modeler is configured to adapt an orientation of the non-rigid parts of the skeleton model and the length to the exterior pose of the person.

4. The system of claim 1 wherein the imaging system comprises a three-dimensional camera configured to image the exterior pose and shape as a three-dimensional point cloud.

5. The system of claim 1 wherein the modeler is configured to normalize the adapted lengths to means for the non-rigid parts, deform the mesh template to the shape with the adapted lengths at the means for the non-rigid parts, and convert the deformed mesh template to the adapted lengths.

6. The system of claim 1 wherein the modeler is configured to deform the mesh template as pose-induced shape deformations as a linear transformation.

7. The system of claim 1 wherein the modeler is configured to deform the mesh template to the shape of the person as a function of ratios of the adapted lengths to mean lengths of the non-rigid parts, absolute orientations of the non-rigid parts, and one or more linear transformations.

8. The system of claim 1 wherein the modeler is configured to deform the mesh template to the shape of the person as a function of bases and means of a principle component analysis subspace.

9. The system of claim 8 wherein the principle component analysis subspace comprises a linear subspace independent of pose.

10. The system of claim 1 further comprising a display configured to display a rendering of the human body representation.

11. A method for human body representation in a representation system, the method comprising:

capturing by a sensor a dataset representing an instance of a body;

modeling a skeleton of the body as bones having variable lengths;

modeling a shape of the body with a linear subspace learnt from training data, the linear subspace being decoupled from the variable lengths; and fitting the skeleton and then the shape to the dataset for the instance of the body.

12. The method of claim 11 wherein modeling the shape comprises modeling the shape with the linear subspace learnt from the training data with principle component analysis.

13. The method of claim 11 wherein capturing comprises capturing a three-dimensional representation of an exterior of the instance of the body.

14. The method of claim 11 wherein modeling the skeleton of the body comprises modeling the skeleton as bones having the variable lengths and orientation.

15. The method of claim 11 wherein modeling the shape comprises modeling the shape with a mean mesh template with the variable lengths normalized to the mean mesh template.

16. The method of claim 11 wherein modeling the shape comprises modeling with a pose-induced shape deformation as a linear transformation.

17. The method of claim 11 wherein fitting the pose comprises detecting landmarks and fitting the variable lengths based on the landmarks and wherein fitting the shape comprises fitting as a function of a length ratio of the fitted variable lengths to mean lengths, a pose-induced shape deformation, an orientation for the pose, and the linear subspace.

18. A non-transitory computer readable storage medium having stored therein data representing instructions executable by a programmed processor for human body representation, the storage medium comprising instructions for:

initializing the human body representation to pose and skeleton size for an instance of a camera captured person;

deforming the human body representation to shape due to tissue for the instance, the deforming being normalized to the skeleton size and pose based on the initialization; and transmitting the human body representation as deformed.

19. The non-transitory computer readable storage medium of claim 18 wherein initializing comprises fitting skeleton lengths as the skeleton size to the instance and fitting orientations of the skeleton lengths to the instance.

20. The non-transitory computer readable storage medium of claim 18 wherein deforming comprises deforming as a function of a pose-induced shape deformation.

* * * * *